United States Patent Office 2,743,522
Patented May 1, 1956

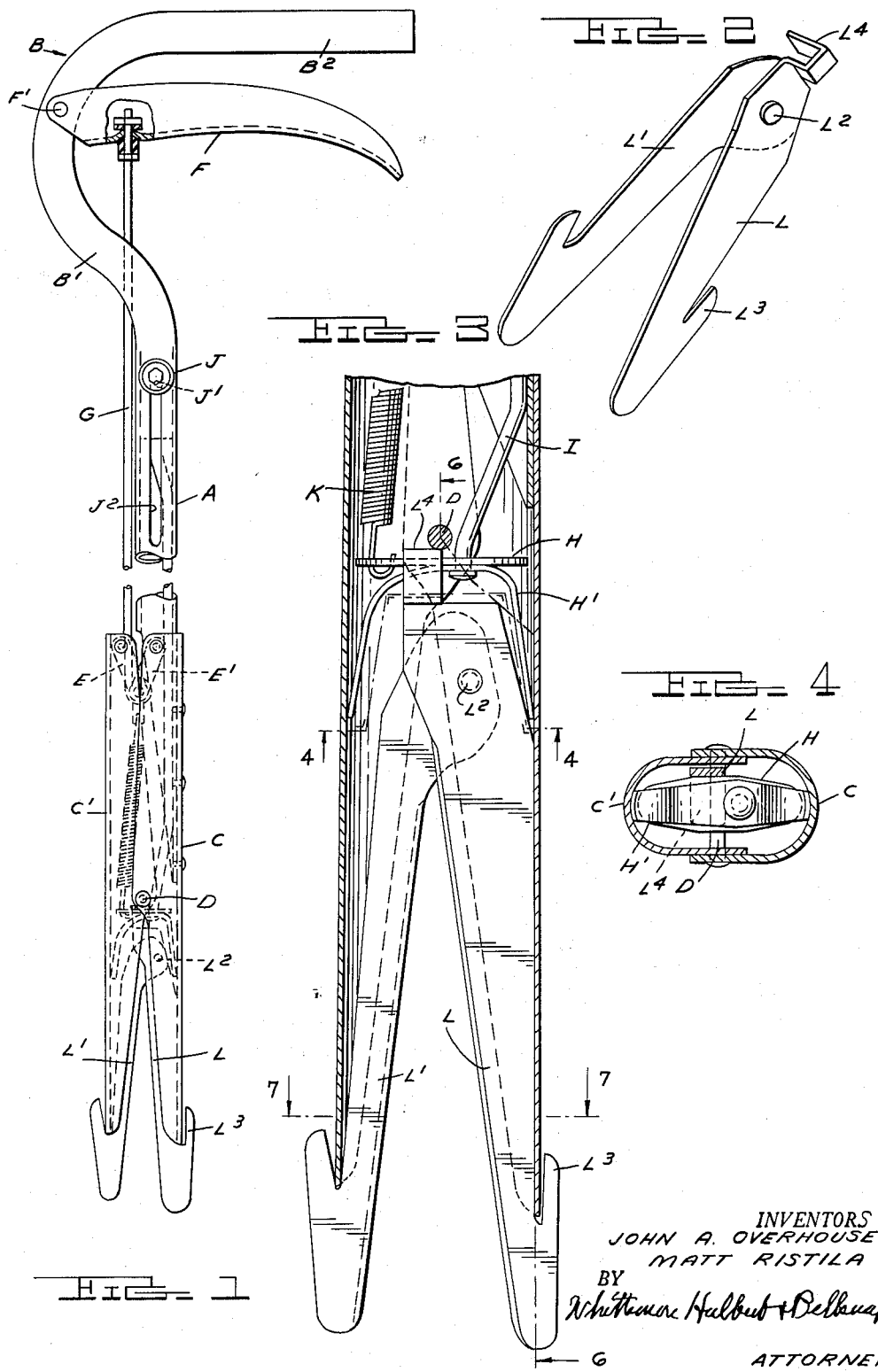

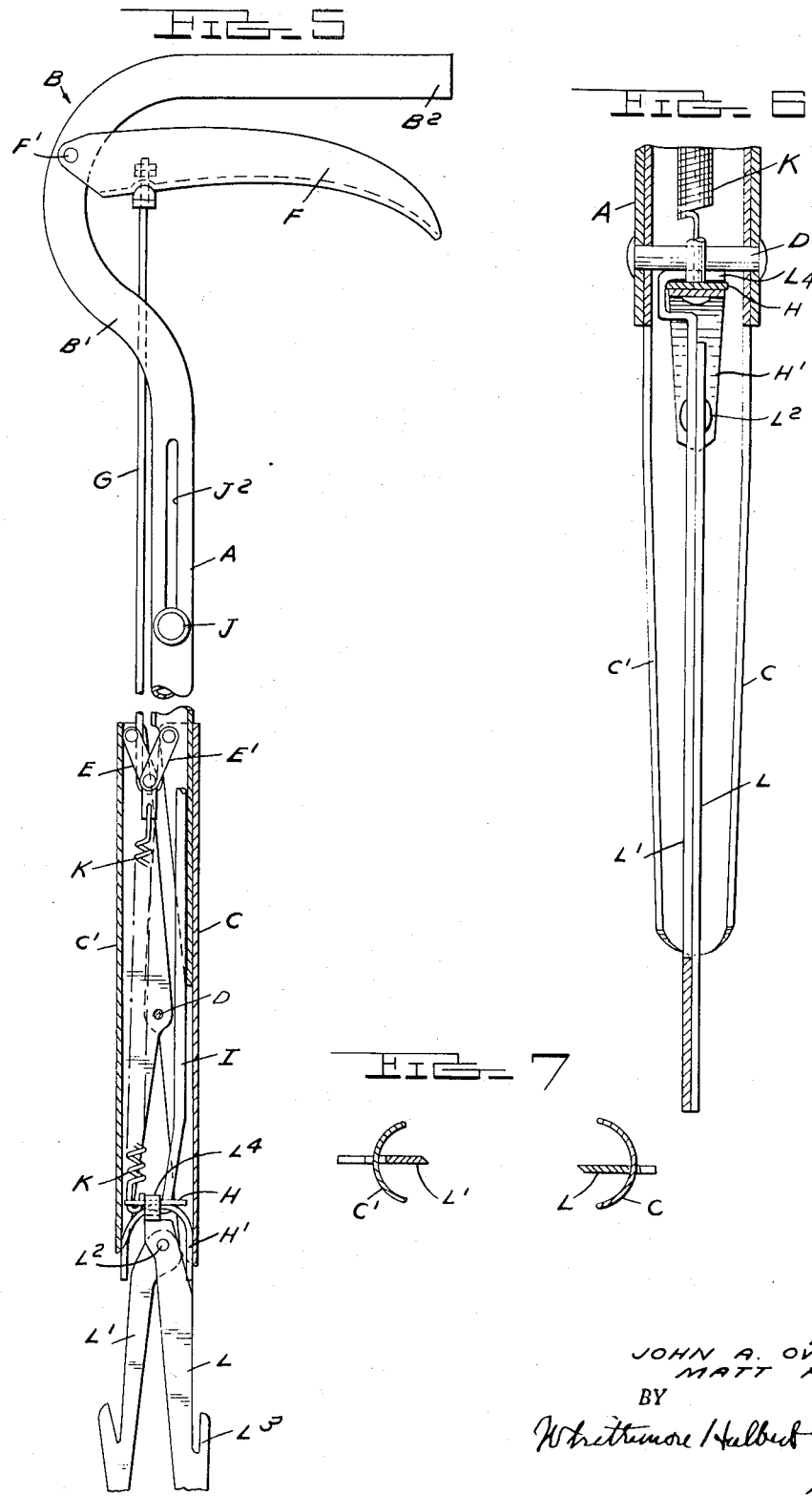

2,743,522

PRUNING ATTACHMENT FOR WEED PULLER

John A. Overhouse and Matt Ristila, Lansing, Mich.

Application October 25, 1954, Serial No. 464,327

3 Claims. (Cl. 30—253)

The invention relates to pruning tools and more particularly to a construction which may be used as an attachment to another instrument such as a weed puller. The latter is a construction in which a staff or cane has mounted on its lower end a pair of jaws, one stationary and the other movable. At the upper end of the staff is a stationary handle and also a movable handle which is connected to the movable jaw for manipulation of the same. Thus, in use, the operator while in standing position can direct the jaws in normal open position to embrace a weed either above or below the surface of the ground and by then clamping the jaws and drawing upwardly on the staff the weed may be pulled.

It is the object of the invention to provide an attachment to a tool of this or of a similar type by which it may be used for pruning. To this end the invention consists in the construction of the pruning means and attachment means to the tool as hereinafter set forth.

In the accompanying drawings:

Fig. 1 is an elevation of a weed pulling tool with the pruning attachment applied thereto;

Fig. 2 is a perspective view of the pruning device detached from the tool;

Fig. 3 is a longitudinal section through the lower portion of the tool illustrating the manner of attaching the pruning shears thereto;

Fig. 4 is a cross section on the line 4—4 of Fig. 3;

Fig. 5 is a view similar to Fig. 1 but in longitudinal section at its lower end illustrating the way in which the pruning shears may be engaged with the tool;

Fig. 6 is a longitudinal section in a plane at right angles to Fig. 5 on line 6—6, Fig. 3, showing the pruning shears fully engaged and in operative position; and Fig. 7 is a cross section on the line 7—7 of Fig. 3.

The construction of the weed pulling tool is not a part of the instant invention and may be varied. However, one construction suitable for the purpose is illustrated and comprises a staff or cane A of tubular form having secured to its upper end a handle B having a curved portion B' extending laterally on one side of the staff and terminating in a straight portion $B^2$ extending laterally to the opposite side of the shaft. Secured to the lower end of the tubular staff is a stationary jaw member C having centrally pivotally attached thereto a movable jaw member C'. As shown in Figures 4 and 7, each of these jaw members is of a U-shaped cross section, one fitting within the other and oppositely arranged with respect thereto. They are centrally pivotally connected to each other by a pin D and at their upper ends are connected by toggle links E and E'. A movable handle F is pivotally attached at F' to the portion B' of the handle B and extends substantially parallel to the portion $B^2$. The handle F is connected by a rod G to the central pivot of the toggle links E and E' which latter, in normal position, are folded or in angular relation to each other to hold the jaws C and C' in open position. When, however, pressure is applied on the movable handle F by the hand grasping the handle portion $B^2$, the rod G will draw upward the toggle links to a position of substantial alignment, thereby powerfully forcing the lower ends of the jaw members towards each other.

Tools of this type are also generally provided with an ejector which when a weed has been pulled by the clamped jaws will eject the same when the jaws are opened. In the construction illustrated, the ejector is formed by a plate member H normally within the tubular staff above the jaws and a resilient U-shaped member H' attached to the plate H and depending therefrom to press against the inner faces of the opposite U-shaped jaws. The plate H is attached to a rod I extending upwardly in the tubular staff which is connected at its upper end with an external laterally extending handle J by means of a pin J' passing through a longitudinal slot $J^2$ in the wall of the tube. A coil spring K is also attached at its lower end to the plate H, the upper end being connected with a suitable anchor, which as shown in Fig. 1 is the central toggle pivot, positioned to hold the spring normally under tension. Thus, to eject the weed, the handle J is pushed downward towards the lower end of the slot $J^2$ which correspondingly presses downward the plate H and resilient U-shaped member H'. This will eject the weed after which the spring K' retracts the members H and H' to normal position.

To a construction of tool as above described or similar in its organization, a pruning device may be applied as follows: This pruning device consists of a pair of shear blades L and L' pivotally attached to each other at their upper ends by the pin $L^2$. Near their lower ends these blades are provided on their outer edges with hooks $L^3$ adapted to engage respectively the lower ends of the jaw members C and C' to attach the blades thereto. To retain the shears in this position, the upper end of the blade L is provided with an upwardly and laterally extending return bend hook $L^4$ adapted to engage the plate H. The construction is such that when this plate is moved to its lower position, as shown in Fig. 5, the jaws C and C' being in their normal open position, the return bend hook $L^4$ may be readily engaged with said plate, contacting with the lower and upper faces thereof to secure the same and locate the blades in the central plane of the jaws. The spring K will then retract the plate carrying with it the shear blades until the hooks $L^3$ will be engaged with the lower ends of the respective jaws. The tool is then in condition for use in pruning, the length of the staff permitting of engaging the shears with overhead branches or twigs. The operator may then close the shear blades by pressure on the handle F which through the rod G straightens the toggle links E and E'. This will impart a very powerful movement to the blades sufficient to sever the branch or twig.

The construction of shear attachment above described can be manufactured at low cost and, by applying it to a tool such as a weed puller, it will serve the purpose of a much more costly shearing tool.

What we claim as our invention is:

1. A pruning attachment for weed pulling tools or the like of the type including a staff having clamping jaws at one end thereof and a handle at the opposite end, operating means adjacent said handle and connections by which said jaws are closed by manipulation of said operating means; said attachment comprising a pair of pivotally connected shearing blades insertable between said jaws when in open position and means for attaching said blades respectively to said jaws including an upturned hook portion at the lower end and a rear edge of each blade for engaging the end of the corresponding jaw over the adjacent outer face thereof, and means for retaining such engagement whereby shearing may be performed by the actuation of said jaws by said operating means 2. The construction as in claim 1 applicable to a weed pulling tool provided with an ejector member movable between said jaws; in which one of said blades is provided with means engageable with said ejector when the latter is in its outer position and both blades are held thereby in engagement with the respective jaws in the retracted position of said ejector.

3. The construction as in claim 2 in which the ejector includes a plate extending transversely between said jaws, and the engagement means between said shearing blades and ejector is a return bend hook projecting upward from one of said blades and adapted to pass beneath and over said plate and locate said blades in the central plane of said jaws.

References Cited in the file of this patent

UNITED STATES PATENTS 415,216    McDonough  ------------  Nov. 19, 1889